United States Patent
Hartmann et al.

(10) Patent No.: US 8,478,994 B2
(45) Date of Patent: Jul. 2, 2013

(54) METHOD FOR ANALYZING CODED DATA STREAMS SIMULTANEOUSLY TRANSMITTED IN IP NETWORKS

(75) Inventors: Siegfried Hartmann, Kranzberg (DE); Jörg Krumböck, Bietigheim-Bissingen (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 591 days.

(21) Appl. No.: 12/675,333

(22) PCT Filed: Jul. 3, 2008

(86) PCT No.: PCT/EP2008/058552
§ 371 (c)(1),
(2), (4) Date: Feb. 25, 2010

(87) PCT Pub. No.: WO2009/030539
PCT Pub. Date: Mar. 12, 2009

(65) Prior Publication Data
US 2010/0313015 A1    Dec. 9, 2010

(30) Foreign Application Priority Data
Aug. 30, 2007  (DE) .......................... 10 2007 041 143

(51) Int. Cl.
*H04L 29/06*  (2006.01)

(52) U.S. Cl.
USPC ........... 713/160; 713/150; 713/168; 709/224; 709/230

(58) Field of Classification Search
USPC ............ 713/150, 151, 160, 161, 168; 380/42, 380/43; 709/224, 231
See application file for complete search history.

(56) References Cited

U.S. PATENT DOCUMENTS

| | | | |
|---|---|---|---|
| 6,931,531 B1 * | 8/2005 | Takahashi | 713/167 |
| 7,050,583 B2 * | 5/2006 | Montgomery | 380/37 |
| 7,242,681 B1 * | 7/2007 | Van Bokkelen et al. | 370/389 |
| 7,356,147 B2 * | 4/2008 | Foster et al. | 380/281 |

(Continued)

FOREIGN PATENT DOCUMENTS

| EP | 1195968 A2 | 4/2002 |
|---|---|---|
| WO | 2005/091549 A1 | 9/2005 |

OTHER PUBLICATIONS

International Preliminary Report on Patentability for PCT/EP2008/058552 (Forms PCT/IB/326, PCT/IB/373, and PCT/ISA/237) (German Translation).

(Continued)

*Primary Examiner* — Linglan Edwards
(74) *Attorney, Agent, or Firm* — Buchanan Ingersoll & Rooney, PC

(57) ABSTRACT

One network protocol (RTP) each, having data packets (dp) comprising an expandable header (KE) is provided for a data stream (ds1 . . . n) encoded in a manner individual to said data stream, and the key information (si1 . . . n) formed in a data stream manner individual to said data stream is inserted into an expandable header (RTPH) of a data packet (dp) of the respective data stream (ds1 . . . n) and transmitted. The key information (sp1 . . . n) is selected in a manner individual to said data stream from the expanded headers (KE) of received data packets (dp) of the respective data stream (ds1 . . . n), and the associated encoded data stream (ds1 . . . n) is decoded by means of at least one piece of selected data stream individual key information (si1 . . . n). The forming and inserting of key information (si1 . . . n) into standard expanded headers (KE) can be performed with little additional expense, thus significantly reducing the expenditure for the analysis or diagnosis of the simultaneously transmitted encoded data streams (ds1 . . . n). Advantageously, the insertion of key information (si1 . . . n) can be activated or initiated only if the diagnosis or analysis and/or the recording of the data streams is currently being performed.

16 Claims, 1 Drawing Sheet

U.S. PATENT DOCUMENTS

| | | | |
|---|---|---|---|
| 2001/0039579 A1* | 11/2001 | Trcka et al. | 709/224 |
| 2002/0025045 A1* | 2/2002 | Raike | 380/280 |
| 2002/0184190 A1* | 12/2002 | Sugiura | 707/1 |
| 2003/0200176 A1* | 10/2003 | Foster et al. | 705/51 |
| 2005/0135419 A1* | 6/2005 | Pullen et al. | 370/473 |
| 2005/0160269 A1* | 7/2005 | Akimoto | 713/171 |
| 2005/0183120 A1* | 8/2005 | Jain et al. | 725/46 |
| 2007/0115832 A1* | 5/2007 | Ramalho | 370/241 |

OTHER PUBLICATIONS

International Preliminary Report on Patentability for PCT/EP2008/058552 (Forms PCT/IB/373 and PCT/ISA/237) (English Translation).

Written Opinion of the International Searching Authority for PCT/EP2008/058552 (Form PCT/ISA/237) (English Translation).

Chen et al., "Security Consideration of IPTV Intermediate Devices", International Telecommunication Union Focus Group on IPTV, FG IPTV-C-0491, May 2007, pp. 1-5.

Baugher et al., "The Secure Real-Time Transport Protocol (SRTP)", The Internet Society (2004), pp. 1-56.

English translation of the International Search Report (Form PCT/ISA/210) for PCT/EP2008/058552.

Written Opinion of the International Searching Authority (Form PCT/ISA/237) for PCT/EP2008/058552.

* cited by examiner

METHOD FOR ANALYZING CODED DATA STREAMS SIMULTANEOUSLY TRANSMITTED IN IP NETWORKS

CROSS-REFERENCE TO RELATED APPLICATIONS

This application is the United States national phase under 35 U.S.C. §371 of PCT International Application No. PCT/EP2008/058552, filed on Jul. 3, 2008, and claiming priority to German Application No. 10 2007 041 143.1, filed on Aug. 30, 2007. Those applications are incorporated by reference herein.

BACKGROUND OF THE INVENTION

1. Field of the Invention

Embodiments of the invention relate to improvements to analysis or diagnosis of simultaneously transmitted data streams.

2. Background of the Art

In communication networks, especially in Voice Over IP communication networks, the RTP (Real Time Protocol) is often used to transmit data streams or multimedia data streams consisting of data packets, i.e., user information or speech information. The RTP is defined in RFC standard 1889, or since 2003 in RFC standard 3550. Due to increased security requirements, data streams have been transmitted encrypted for quite some time, and the secure RTP used for this is described in RFC standard 3711. In this context, the key information required for encryption is assigned and used on a data-stream-specific basis. As an example, for a multimedia session between two endpoints on an IP-based communication network, an audio and a video data stream are each transmitted in one transmission direction. Related to both transmission directions, four data streams are transmitted within a multimedia session, each of which is encrypted separately, i.e., encrypted data-stream-specifically. The key information for that particular session or data stream is assigned or processed during connection signaling—using the SIP (Session Initiation Protocol), for example—with a special key used to encrypt the connection signaling—Pre-shared Secrets, for example—which cannot be recognized even if the data stream is hacked.

In communication networks, multiple data streams or multimedia data streams are generally transmitted through a transmission leg or transmission segment. For problem situations arising in communication networks, analysis or diagnosis of the transmitted data streams is necessary in order to locate or delimit errors. For error analysis or diagnosis, reconstruction of the unencrypted data streams is usually necessary. An analysis or diagnosis is often performed on transmission segments with multiple data streams transmitted simultaneously using the RTP, so that the key information in the data streams (RTP data streams, for example), is not available and cannot be determined even during connection signaling, because the signaling information and the key information are re-encrypted, and the key information used is not available.

BRIEF SUMMARY OF THE INVENTION

Embodiments taught herein improve the analysis or diagnosis of individual or simultaneously transmitted data streams containing data packets, with data streams generated and encrypted data-stream-specifically according to a network protocol for data stream transmission.

Embodiments reported herein may provide a network protocol with data packets having an extendable header, and that data-stream-specifically generated key information is inserted and transferred into an extended header of a data packet of the respective data stream. From the extended headers of the received data packets in the respective data stream, the key information is selected data-stream-specifically and the associated, encrypted data stream is decrypted using at least one piece of selected key information.

In embodiments reported herein key information can be generated and inserted with minimal administrative effort and that efforts for analysis or diagnostics of simultaneously transferred data streams can be significantly reduced, so that the additional user information can be transmitted in the data packet with extended header. Preferentially the insertion of key information in an extended header of a data packet can be enabled or initiated only while the data stream's analysis or diagnostics are being performed.

In a preferred embodiment, the network protocol with extendable header is the standardized network protocol according to the RFC Standard 3550 or 1889, whereby the data streams (ds1 . . . n) are encrypted according to the Secured Real Time Protocol (SRTP). The standardized SRTP protocol is based on the standardized RTP (Real Time Protocol) according to RFC Standard 3550 or 1889. Through the use of the RTP, key information can be inserted into the standard extendable header with minimal additional effort.

In another embodiment, it is possible in the network protocol to determine a data packet type for data packages with inserted key information so that the data packets may be discarded, if the data stream is received in accordance with the network protocol, whereby no payload data will be inserted in the data packet. This ensures that the key information is not read if the data packets are transmitted according to network protocol by a network protocol-compliant data receiver. The data packet type for the data packets is defined as a data packet type that is new for the network or preferentially a previously unused data packet type, where the data packets are not read by a network protocol-compliant receiver, if the transfer is according to network protocol.

In another preferred embodiment, the data-stream-specific key information will be continuously inserted in the respective data stream's data packets with extended headers. Upon detection of several data packets with inserted key information, this allows continuous examination of the key information or examination of key information after a regular number of received data packets. Since not every data packet must be checked for inserted key information, the dynamic load is reduced.

Preferentially, the data-stream-specific insertion of key information (si1 . . . n) for analysis or diagnostics and/or recording of data streams (ds1 . . . n) can be enabled and subsequently disabled. By enabling the insertion of key information in data packets only during diagnostics of data streams, high security during operations without diagnostics remains intact.

Additional preferential developments of the invented method and one embodiment of an arrangement according to the invention can be found in other claims.

The following text further explains the invention and its developments, with reference to two drawings.

DETAILED DESCRIPTION OF THE INVENTION

Figure 1:
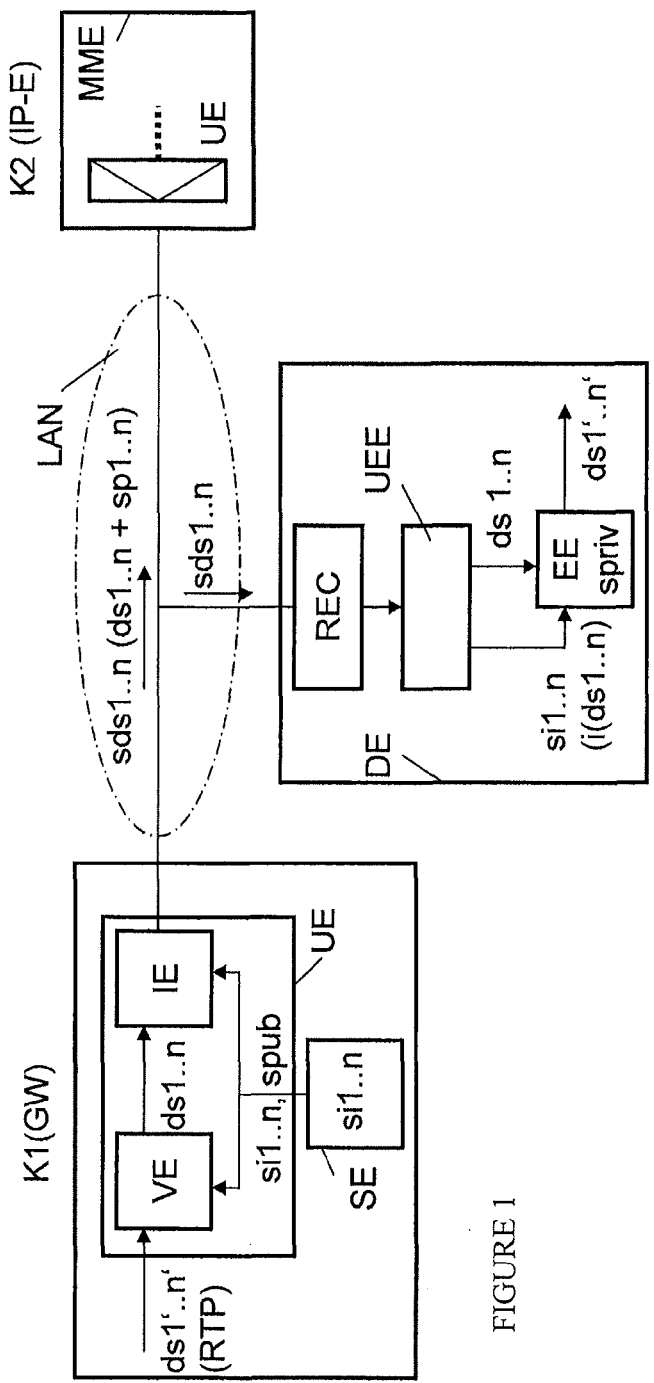
FIG. 1, a schematic showing one communication arrangement for applying the invented method, and FIG. 2, a data packet suitable for the communication arrangement according to the invention.

FIG. 1 is a schematic diagram showing an example of a communication arrangement in which the invented method is used, including only components in which the invented method is implemented or which are necessary in order to clarify the invented method.

The communication arrangement is suitable for Voice Over IP, i.e., for transmitting spoken information in the IP protocol, with signaling by means of the standardized H.323 or SIP protocol. For speech and/or video transmission, use of the RTP (Real Time Protocol) is preferred, with speech and/or video information transmitted directly between the components that are connected by signaling. The RTP is defined in RFC standard 1889 or 3550 and consists of a protocol for continuous transmission of real-time data, e.g., audiovisual or multimedia data over IP-based networks. The data packets to be transferred are coded and then inserted for transmission in IP-compliant data packets via IP-based networks. The data packets are transferred within a session between IP terminals, whereby each session is assigned at least one data stream ds or several data streams. The RTP is suitable for transmission of individual data streams ds as well as for simultaneous transmission of multiple data streams ds1 ... n or data packets. For the execution example given here, it is assumed that multiple data streams ds1 ... n, i.e. multimedia streams, are transmitted simultaneously between components of an IP-based network.

Due to increased security requirements for transmitting data streams ds, it has become increasingly common to encrypt data streams ds, especially data streams ds transmitted according to the RTP. Key information si, which is recognized by the components between which the data streams are transmitted in an IP-based network, is used for this encryption. A protocol for encrypting RTP data streams is defined in the SRTP (Secure Real Time Protocol) according to RFC standard 3711. It uses a symmetrical encryption system that offers a high degree of security.

The communication arrangement consists of a first component K1 that is represented in the execution example by a Gateway GW. The Gateway GW can, for example, be connected via a local network LAN—hereafter designated as LAN and represented in FIG. 1 by a dash-and-dot outlined oval—to a second component K2, which in the execution example is represented by an Internet endpoint IP-E such as a multimedia terminal MME. The LAN can consist physically and procedurally of an Ethernet, for example.

For the execution example, it is further assumed that multiple data streams ds1' ... n' or multimedia data streams generated according to the RTP are to be transmitted simultaneously from the Gateway GW to the Internet endpoint IP-E. As an example, the multiple data streams ds1' ... n' are generated as audio data streams and video data streams, and both an audio and a video data stream can be assigned to each session. In addition, the data streams ds1' ... n' generated according to the RTP are encrypted data-stream-specifically, using an encryption unit VE. This means that, for each data stream ds1' ... n', a different piece of key information si1 ... n is designated for encryption. RTP data streams ds are encrypted preferably using the SRTP according to RFC standard 3711.

According to the invention, the encrypted data streams ds1 ... n from the data-stream-specifically encrypted data streams ds1 ... n should be decrypted for analysis of the data streams by a diagnosis unit DE. Normally a diagnosis unit DE is not involved in the signaling between the connection-generating components of an IP-based network, so as part of the signaling the used key information si is processed for each individual data stream. Of course, signaling could also be analyzed by the diagnosis unit DE, but the key information si1 ... n for the data streams ds1 ... n could not be determined, because the signaling and the key information are re-encrypted and the pieces of key information for these encryptions are not available to the diagnosis unit, nor can they be determined from the signaling information. This means that the diagnosis unit DE has no information about the key information si used in the data streams ds1 ... n.

So that data streams ds1 ... n generated according to the SRTP can still be decrypted, the invented method is used, with the invented method applied in the execution example to the simultaneous transmission of multiple data streams sds1 ... n generated according to the SRTP from the Gateway GW to the IP endpoint IP-E. The methods and components described below apply to the opposite transmission direction.

In the gateway GW, the data streams ds1' ... n' are encrypted in an encryption unit VE according to the SRTP, whereby the encryption unit VE is arranged together with an insertion unit IE within a transmission unit UE. The required key information si1 ... n is stored in a key unit SE and is available from the encryption unit VE and the insertion unit IE, designated in FIG. 1 by an arrow marked with si1 ... n. This means that a piece of key information si1 ... n is designated for each data stream ds1' ... n', i.e., the data streams ds1' ... n' are encrypted data-stream-specifically.

Figure 2:
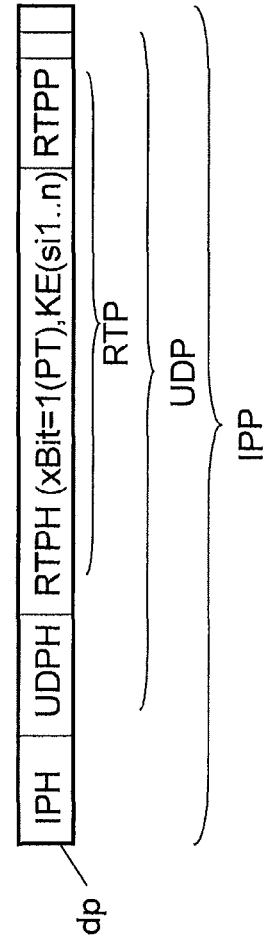

Within the insertion unit IE, the extension KE—see FIG. 2—of the header will be inserted in the data packet dp intended for transmitting the key information si1 ... n according to the RTP protocol by setting the header extension bits to 1. Furthermore, the number of 16-bit words included in the header extension is indicated in the extension KE of the header RTPH or in the header extension Additionally, a piece of data packet type information or a payload type PT according to the RTP may be indicated in the key information si1 ... n provided for transmission, which defines a data packet as a data packet dp with inserted key information. For this, a payload type PT should be selected or specified, which is not used in the standard data packets, and data packets with the selected payload type PT will be discarded during standard transmissions. This means that in this version, no user information or payload may be inserted in the data packet dp.

In order to increase the security during transmission of data packets dp with key information si1 ... n, the data packets dp1 or the key information si1 ... n contained in them may be additionally encrypted. Additional key information is needed for this, and it is generated using a public key spublic and a private key spriv. In this case, the public key spub for the additional encryption is provided in the key unit SE in the Gateway GW and is sent to the transmission unit UE for encryption of the data packets dp or the key information si1 ... n contained in them, shown in FIG. 1 as an arrow marked spub. The private key spriv is provided to the diag nosis unit DE by the decryption unit EE and is used to decrypt the additional encrypted data packets dp or key information si1 . . . n, shown in FIG. 1 by the designation spriv in the decryption unit EE.

Subsequently, the key information si1 . . . n will be inserted in the extension KE of the header RTPH or the extension header of the data packets of the respective data streams ds1 . . . n.

The data streams sds1 . . . n containing key data packets si1 . . . n are transmitted over the LAN to the IP endpoint IP-E. A diagnosis unit DE connected to the LAN is provided for the purpose of diagnosing or analyzing the data streams sds1 . . . n. So that the data streams sds1 . . . n containing the key information si1 . . . n can be analyzed, the encrypted data streams sds1 . . . n must be decrypted. As explained previously, for each encrypted data stream ds1 . . . n, the key information si1 . . . n needed for decryption is necessary. Since according to the invention, the data packets dp that contain the key information si1 . . . n are inserted in the data streams sds1 . . . n, the diagnostics unit DE uses a monitoring unit UEE to search, read, and store data packets dp in the respective data streams ds1 . . . n that indicate an extension KE of the header RTPH or a header extension. Additionally, data packets dp with key information si1 . . . n can also be detected by the payload type PT.

In the data streams psd1 . . . n from the respective extensions KE of the header RTPH or header extension of the detected data packet dp, the key information si1 . . . n will be selected and stored, after which the key information si1 . . . n can be removed from the extensions KE of the header RTPH or the header extensions. Additionally, the extension of the headers RTPH can be reset by inserting suitable information in the header. Together with the respective key information si1 . . . n, a piece of information i(ds1 . . . n) from the extensions KE of the headers RTPH must be found and stored, to determine for which of the data streams ds1 . . . n the key information si1 . . . n for decryption is provided.

Both the encrypted data streams ds1 . . . n and the selected key information si1 . . . n are transferred to a decryption unit EE. In it the respective key information si1 . . . n, i.e., the decryption information and the information i(ds1 . . . n), is used to decrypt the encrypted data streams sds1 . . . n. After decryption, the unencrypted data streams ds1' . . . n' are ready for diagnosis or analysis in the diagnosis unit DE.

Preferentially or optionally, the diagnosis unit DE is provided with a recording unit REC inserted between the LAN and the diagnosis unit DE, in which the data streams sds1 . . . n can be recorded. Key information si1 . . . n can then be selected and recorded data streams sds1 . . . n analyzed or diagnosed at a later time; they can be recorded at night, for example, and diagnosed later during the day. Alternatively, the recording unit REC can also be inserted after the encrypted data streams sds1 . . . n are decrypted—not shown—so that the data streams ds1' . . . n' are unencrypted when readied for diagnosis or analysis.

FIG. 2 shows the protocol structure of a data packet dp, in which a piece of key information si1 . . . n is inserted. The data packet dp is generated according to the standard RTP and includes a RTPH heading portion according to RFC 3550—known as a header in the industry—and a RTPP usable portion known as the payload. The RTP is embedded in a UDP, whose header UDPH is added into the RTP header RTPH. Because an IP-based transmission is involved, the UDP is packed into an IP protocol IPP, to which an IP header IPH is added. When there is a transmission over the LAN, especially an Ethernet LAN, the corresponding protocol element is still referenced—shown only partially for clarity.

In the header RTPH of the RTP, the information on the extension KE of the header RTPH presents an important piece of information for the invented method. For this, an x-bit is provided according to the RTP standard, whereby the setting x-bit=1 shows the header extension, designated as xBit=1 in FIG. 2. Additionally, a piece of information on the payload type PT can be inserted, designated with the label PT in FIG. 2. The payload type PT used is designated in the RTP, but no payload type PT is assigned to it. A payload type PT of "19" is defined in the standardization phase, but it is later designated as unused and then as "reserved." Therefore, to designate an RTP data packet with key information si1 . . . n, the use of payload type 19 is preferred. For the additional use of a payload type PT, no user information 1 may be inserted in the payload RTPP, since data packets dp generated this way will be discarded by the receiving component during standard transmissions.

The extension KE of the header PTRH or the header extension is positioned in the standardized RTP header RTPH according to table 1 below, wherein the numbering 0 . . . 31 represents one bit.

According to table 1, the x-bit shows the header extension KE, i.e., an x-bit=1 indicates that the header PTRH of a data packet is extended. The scope of the extension is indicated by the number of 16-bit fields in the header extension field. The key information si1 . . . n for the respective data stream ds1 . . . n is inserted in the extension header KE, and the following table 2 shows the key information si used for decryption according to the standardized SRTP, wherein the numbering 0 . . . 9 represents one bit.

TABLE 1

```
 0                   1                   2                   3
 0 1 2 3 4 5 6 7 8 9 0 1 2 3 4 5 6 7 8 9 0 1 2 3 4 5 6 7 8 9 0 1
+---+-+-+-------+-+-------------+-------------------------------+
|V=2|P|X|  CC   |M|     PT      |       sequence number         |
+---+-+-+-------+-+-------------+-------------------------------+
|                           timestamp                           |
+---------------------------------------------------------------+
|           synchronization source (SSRC) identifier            |
+===============================================================+
|            contributing source (CSRC) identifiers             |
|                             ....                              |
+---------------------------------------------------------------+
|       defined by profile      |            length             |
+-------------------------------+-------------------------------
                        header extension KE
                             . . . .
```

TABLE 2

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    Version    |   BeaconType  |F|  Rsv  | NbCtx |    NbKeys     |
+-+-+-+-+-+-+-+-+-+-+-+-+-+-+-+-+-+-+-+-+-+-+-+-+-+-+-+-+-+-+-+-+
| SCIAuthTagLen |  KEK SPI len  |      Encrypted KEK length      |
+-+-+-+-+-+-+-+-+-+-+-+-+-+-+-+-+-+-+-+-+-+-+-+-+-+-+-+-+-+-+-+-+
~                            Contexts                            ~
+-+-+-+-+-+-+-+-+-+-+-+-+-+-+-+-+-+-+-+-+-+-+-+-+-+-+-+-+-+-+-+-+
~                              Keys                              ~
+-+-+-+-+-+-+-+-+-+-+-+-+-+-+-+-+-+-+-+-+-+-+-+-+-+-+-+-+-+-+-+-+
~                          Encrypted KEK                         ~
+-+-+-+-+-+-+-+-+-+-+-+-+-+-+-+-+-+-+-+-+-+-+-+-+-+-+-+-+-+-+-+-+
~                             KEK SPI                            ~
+-+-+-+-+-+-+-+-+-+-+-+-+-+-+-+-+-+-+-+-+-+-+-+-+-+-+-+-+-+-+-+-+
~                       SCI Authentication tag                   ~
+-+-+-+-+-+-+-+-+-+-+-+-+-+-+-+-+-+-+-+-+-+-+-+-+-+-+-+-+-+-+-+-+
```

The information in table 1 has the following meaning according to SRTP Standard.

Version:
    Version of the tracebeacon.
BeaconType:
In
    Content of the tracebeacon.
F:
    Indicate if the lengths of the variable fields is fixed to their maximum values (the lengths are fixed if F == 1).
Rsv:
    Reserved bits.
NbCtx:
    Indicates the number of contexts contained in the packet. A context is an association between a direction (Tx/Rx) and an SSRC. It has been judged that a maximum of 15 contexts should suffice for the current purposes.
NbKeys:
    Indicates the number of keys contained in the packet.
SCIAuthTagLen:
    The length of the authentication tag appended to the tracebeacon. This length will always be zero for now as the authentication is not expected to be used in the short-term.
KEK SPI Len:
    Length in bytes of the SPI needed to retrieve the key that encrypted the KEK. This length can be zero if the Encrypted KEK is not present in the tracebeacon.
Encrypted KEK length:
    Length of the symmetric key encrypted using RSA, in bytes. This length can be zero if the tracebeacon does not contain this key. Since the Encrypted KEK can be the longest part of the tracebeacon, sending the Encrypted KEK in, say, one tracebeacon out of two can result in appreciable gains in the average size of the tracebeacons sent.
Contexts:
    Configuration, information for the contexts (see the next diagrams).
Keys:
    Configuration information for the keys (see the next diagrams).
Encrypted KEK:
    Symmetric key encrypted using RSA. This field can take up to 256 bytes when the public key has 2048 bits and does not need to end on a 32 bits boundary. This field is also optional as it can have a length of zero
KEK SPI:
    Identifier that allows to retrieve the key needed to decrypt the KEK. In your case this field corresponds to a Certificate Id. This field does not need to end on a 32 bits boundary. Like the Encrypted KEK this field is optional, as it can have a length of zero.

-continued

SCI Authentication tag:
    The authentication tag of the tracebeacon. The authenticated portion of the tracebeacon will be the first eight bytes, the contexts and keys sections. This field is optional, as the authentication tag length can be zero. It is indeed not expected to be present for this version of the tracebeacon.

Using the previously described key information si1 ... n according to the standardized SRTP, the encrypted data streams ds1 ... n are decrypted, i.e. transformed back into the original data streams ds1' ... n'. The data streams ds1' ... n' can be processed in the diagnosis unit DE using the implemented diagnosis routines—not shown.

The invention claimed is:

1. A method for decrypting at least one encrypted data stream containing data packets in which a first data stream is data-stream-specifically generated and data-stream-specifically encrypted according to a network protocol for encrypting and transmitting data streams, comprising:
    providing the network protocol defining an extendable header for the data packets;
    determining a data packet type in such a way that data packets of the first data stream are discarded by a second component of the communication arrangement when the data packets of the first data stream include key information inserted within the extendable header of the data packets in accordance with the network protocol;
    a first component of a communication arrangement generating the key information data-stream-specifically;
    the first component inserting the key information into the extendable header of a data packet of the first data stream;
    the first component transmitting the data packet of the first data stream to the second component of the communication arrangement via a network connection;
    a diagnosis unit recording the data packet of the first data stream;
    the diagnosis unit selecting the key information from the header of the received data packet of the first data stream; and
    the diagnosis unit decrypting the data packet of the first data stream using the key information from the header.

2. The method of claim 1, wherein the network protocol with the defined extendable header is a standardized network protocol according to RFC Standard 3550 or 1889, and wherein the first data stream is encrypted according to the Secured Real Time Protocol.

3. The method of claim 1, comprising providing as the data packet type for the data packets having the key information within the extendable header of the data packets a data packet type selected from the group consisting of a data packet type that is new to the network and an unused data packet type.

4. The method of claim 1, comprising continuously generating data-stream-specific key information in the data packets of the first data stream and inserting the generated data-stream-specific key information within the header of the data packets of first data stream.

5. The method of claim 1, comprising encrypting the key information with key encryption related information, the key encryption related information provided for at least one of analysis, diagnostics, and a recording.

6. The method of claim 5, comprising representing the key encryption related information as an asymmetrical piece of key information so that a piece of key information is provided for encrypting the key information that is different than that used to encrypt the data packet of the first data stream.

7. The method of claim 1, comprising activating and subsequently deactivating the data-stream-specific insertion of key information for at least one of analysis, diagnosis, and recording of the data streams.

8. An arrangement for decrypting at least one encrypted data stream containing data packets in which a data stream is data-stream-specifically generated and data-stream-specifically encrypted according to a network protocol for encrypting and transmitting data streams, comprising:

a diagnosing unit having memory, a recording unit, a monitoring unit and a decryption unit;

the recording unit recording a first data packet of an encrypted data stream from a first component of a network via a network connection, the encrypted data stream being directed to a second component of the network, the first data packet having an extended header in which key information for encrypting the first data packet was inserted, the key information being generated data stream specifically;

the monitoring unit searching data packets recorded by the recording unit and storing the first data packet upon a determination that the extended header of the first data packet included the key information;

the decryption unit decrypting the first data packet based upon the key information within the extended header of the first data packet, the first data packet being decrypted so that the first data packet is diagnosable or analyzable; and wherein the first data packet is a data packet type that is defined by the network protocol in such a way that the first data packet is discarded by the second component in accordance with the network protocol.

9. The arrangement of claim 8, wherein the monitoring unit and the decryption unit are integrated.

10. The arrangement of claim 8, wherein the monitoring unit searches data packets recorded by the recording unit to determine whether any of the recorded data packets has an extended header that is extended in accordance with the network protocol.

11. The arrangement of claim 8, wherein the key information is encrypted within the first data packet and the first data packet and the decryption unit has a private key usable to decrypt the encrypted key information prior to using the decrypted key information to decrypt the first data packet.

12. The method of claim 1 wherein the data packet is structured so that there is no payload data within the data packet and the data packet is discarded after receipt by a data receiver that is compliant with the network protocol such that the data receiver does not read the data packet.

13. The method of claim 12 wherein the second component comprises the data receiver.

14. The method of claim 1 wherein the generation of the key information and the insertion of the key information is enabled only during diagnostics of the first data stream.

15. The arrangement of claim 11 wherein the diagnosis unit decrypts the key information via the private key.

16. The arrangement of claim 8 wherein the network protocol with the defined extendable header is based on a standardized network protocol according to RFC Standard 3550 or 1889, and wherein the first data packet is encrypted according to the Secured Real Time Protocol.

* * * * *